US012764470B2

(12) United States Patent
Zhong et al.

(10) Patent No.: US 12,764,470 B2
(45) Date of Patent: Oct. 13, 2026

(54) SPEAKER AND SPEAKER BOX USING SAME

(71) Applicant: AAC Microtech (Changzhou) Co., Ltd., Changzhou City (CN)

(72) Inventors: Zhiwei Zhong, Changzhou (CN); Bo Xiao, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 123 days.

(21) Appl. No.: 19/006,317

(22) Filed: Dec. 31, 2024

(65) Prior Publication Data

US 2025/0380089 A1 Dec. 11, 2025

Related U.S. Application Data

(63) Continuation of application No. PCT/CN2024/098027, filed on Jun. 7, 2024.

(51) Int. Cl.

| | |
|---|---|
| ***H04R 9/02*** | (2006.01) |
| ***H04R 1/02*** | (2006.01) |
| ***H04R 9/04*** | (2006.01) |
| ***H04R 9/06*** | (2006.01) |

(52) U.S. Cl.
CPC ............. *H04R 9/025* (2013.01); *H04R 1/025* (2013.01); *H04R 9/045* (2013.01); *H04R 9/06* (2013.01); *H04R 2400/11* (2013.01)

(58) Field of Classification Search
CPC ........ H04R 9/025; H04R 1/025; H04R 9/045; H04R 9/06; H04R 2400/11; H04R 2499/11
USPC ........................................ 381/412, 420, 421
See application file for complete search history.

(56) References Cited

U.S. PATENT DOCUMENTS

| | | | | |
|---|---|---|---|---|
| 10,341,780 B2 * | 7/2019 | Wang | H04R 31/003 | |
| 11,696,077 B2 * | 7/2023 | Song | H04R 9/025 | 381/412 |
| 11,758,321 B2 * | 9/2023 | Ren | H04R 1/021 | 381/386 |
| 11,770,653 B2 * | 9/2023 | Xiao | H04R 7/16 | 381/412 |
| 12,120,495 B2 * | 10/2024 | Ren | H04R 9/06 | |
| 12,149,910 B2 * | 11/2024 | Shi | H04R 9/025 | |
| 12,532,123 B2 * | 1/2026 | Yin | H04R 9/025 | |
| 12,587,790 B2 * | 3/2026 | Yin | H04R 9/025 | |

(Continued)

*Primary Examiner* — Xu Mei
(74) *Attorney, Agent, or Firm* — Wiersch Law Group

(57) ABSTRACT

The present disclosure provides a speaker which includes a frame, a vibration system having a diaphragm and a voice coil, a magnetic circuit system including a lower plate, a main magnetic assembly, and an auxiliary magnetic assembly. The main magnetic assembly includes a first main magnet, a main pole plate, and a second main magnet. The auxiliary magnetic assembly includes a first auxiliary magnet, an auxiliary pole plate, and a second auxiliary magnet. The magnetic circuit system further includes an upper plate. The speaker further includes a fixing ring fixed to the upper plate, including a first connecting part fixed to the upper plate, and a second connecting part extending from the first connecting part toward the lower plate for connecting to an inner periphery of the diaphragm. The disclosure optimizes the magnetic circuit system and improves drop resistance. A speaker box is also provided.

10 Claims, 3 Drawing Sheets

(56) References Cited

U.S. PATENT DOCUMENTS

| | | | | |
|---|---|---|---|---|
| 12,659,648 | B2 * | 6/2026 | Ren | H04R 1/24 |
| 2025/0211910 | A1 * | 6/2025 | Ren | H04R 9/046 |

* cited by examiner

SPEAKER AND SPEAKER BOX USING SAME

TECHNICAL FIELD

The present application relates to the field of electronic products, and more particularly, to a speaker and a speaker box using such a speaker.

BACKGROUND

With the development of electronic technology, portable consumer electronic devices have become increasingly popular, such as mobile phones, handheld game consoles, navigation devices, or handheld multimedia entertainment devices. These electronic devices generally use voice for system feedback, such as call alerts on mobile phones or navigation prompts, which require the use of speakers.

Conventional speakers include a housing and a frame, a vibration system, and a magnetic circuit system accommodated within the housing. The magnetic circuit system includes a lower plate, a main magnetic assembly disposed on the lower plate, and an auxiliary magnetic assembly arranged around the main magnetic assembly to form a magnetic gap. Typically, the main magnetic assembly and the auxiliary magnetic assembly each include only one magnet and a pole plate attached to the magnet, resulting in low magnetic circuit efficiency. The vibration system includes a diaphragm and a voice coil configured to drive the diaphragm to generate sound. Since the position of the diaphragm is relatively fixed with respect to the magnetic circuit system, the position of the diaphragm is constrained by the magnetic circuit system, making it difficult to adjust the position of the diaphragm to meet different design requirements. Additionally, the magnetic circuit system is accommodated within the housing and spaced apart from the housing, which increases the overall height of the speaker and is not conducive to the miniaturization of the speaker.

Therefore, it is necessary to propose a new technical solution to address the above problems.

SUMMARY

The object of the present application is to provide a speaker and a speaker box with high magnetic circuit efficiency and maximized magnetic circuit thickness.

To achieve the above purpose, the present invention provides a speaker, which comprises a frame; a vibration system fixed to the frame, including a diaphragm fixed to the frame and a voice coil for driving the diaphragm to vibrate; a magnetic circuit system for driving the vibration system to generate sound, including a lower plate fixed to the frame and spaced apart from the diaphragm, a main magnetic assembly disposed on the lower plate, an auxiliary magnetic assembly arranged around the main magnetic assembly for forming a magnetic gap for at least partially receiving the voice coil.

The main magnetic assembly includes a first main magnet disposed on the lower plate; a main pole plate disposed on the first main magnet; and a second main magnet disposed on the main pole plate.

The auxiliary magnetic assembly includes a first auxiliary magnet disposed on the lower plate; an auxiliary pole plate disposed on the first auxiliary magnet; and a second auxiliary magnet disposed on the auxiliary pole plate.

The magnetic circuit system further includes an upper plate arranged opposite to the lower plate, the upper plate comprising a first part fixed to the second main magnet, a second part extending from the first part toward the lower plate, and a third part extending from the second part away from the second main magnet and fixed to the second auxiliary magnet.

The speaker further includes a fixing ring fixed to the upper plate, including a first connecting part fixed to the upper plate, and a second connecting part extending from the first connecting part toward the lower plate for connecting to an inner periphery of the diaphragm.

As an improvement, the diaphragm is arranged around the second auxiliary magnet, and a portion of the diaphragm is located above the auxiliary pole plate.

As an improvement, the first connecting part is supported on a step formed between the second part and the third part, or the first connecting part is sandwiched between the third part and the second auxiliary magnet.

As an improvement, the vibration system includes a skeleton fixed to the diaphragm and configured to suspend the voice coil in the magnetic gap; the voice coil incudes a rectangular structure with rounded corners; the skeleton comprises a main body part spaced apart from the diaphragm, a fixing part extending from the main body part and bent toward the diaphragm, the fixing part being fixed to the diaphragm, and a supporting part extending from a corner of the main body part toward the voice coil, the supporting part being fixed to a rounded corner of the voice coil to support the voice coil.

As an improvement, the auxiliary magnetic assembly includes four groups, the four groups being respectively arranged on four sides of the main magnetic assembly, each group of the auxiliary magnetic assembly being disposed between two corresponding supporting parts, wherein the main magnetic assembly and the auxiliary magnetic assembly are magnetized along a vibration direction of the vibration system; the first main magnet and the second main magnet are magnetized in opposite directions; the first auxiliary magnet and the second auxiliary magnet are magnetized in opposite directions; and the first main magnet and the first auxiliary magnet are magnetized in opposite directions.

As an improvement, the fixing ring is made of nickel.

The present invention further provides a speaker box, comprising an upper cover; a lower cover for forming an accommodating cavity together with the upper cover; and a speaker as described in claim 1 fixed to the upper cover. The upper cover includes a body portion assembled with the lower cover, the body portion being formed with a first through hole corresponding to the speaker. The upper cover further includes a steel sheet fixed to the body portion and covering the first through hole, the steel sheet being formed with a second through hole, and an inner periphery of the steel sheet being supported on a step formed between the second part and the third part.

As an improvement, an upper surface of the steel sheet aligns with an upper surface of the first part.

As an improvement, the body portion is further formed with an accommodating groove recessed from an upper surface of the body portion, the steel sheet being accommodated in the accommodating groove, and an upper surface of the steel sheet aligning with the upper surface of the body portion.

As an improvement, the diaphragm and the steel sheet are spaced apart for forming a front cavity of the speaker box.

Compared with the prior art, the speaker provided by the present application includes a main magnetic assembly comprising a first main magnet disposed on the lower plate, a main pole plate disposed on the first main magnet, and a second main magnet disposed on the main pole plate. The auxiliary magnetic assembly includes a first auxiliary magnet disposed on the lower plate, an auxiliary pole plate disposed on the first auxiliary magnet, and a second auxiliary magnet disposed on the auxiliary pole plate. This opposing magnetic circuit configuration increases the magnetic field strength in the magnetic gap, enhances the driving force of the voice coil, and significantly improves the BL value (i.e., the product of magnetic flux density B and voice coil length L) of the voice coil, thereby increasing the efficiency of the magnetic circuit. By providing an upper plate fixed to the main magnetic assembly and the auxiliary magnetic assembly, and a fixing ring fixed to the upper plate, the diaphragm is fixed to the magnetic circuit system through the fixing ring. The height of the diaphragm can be adjusted via the fixing ring, and the impact of dimensional tolerances on the concentricity of the diaphragm during assembly can be optimized.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

Figure 1:
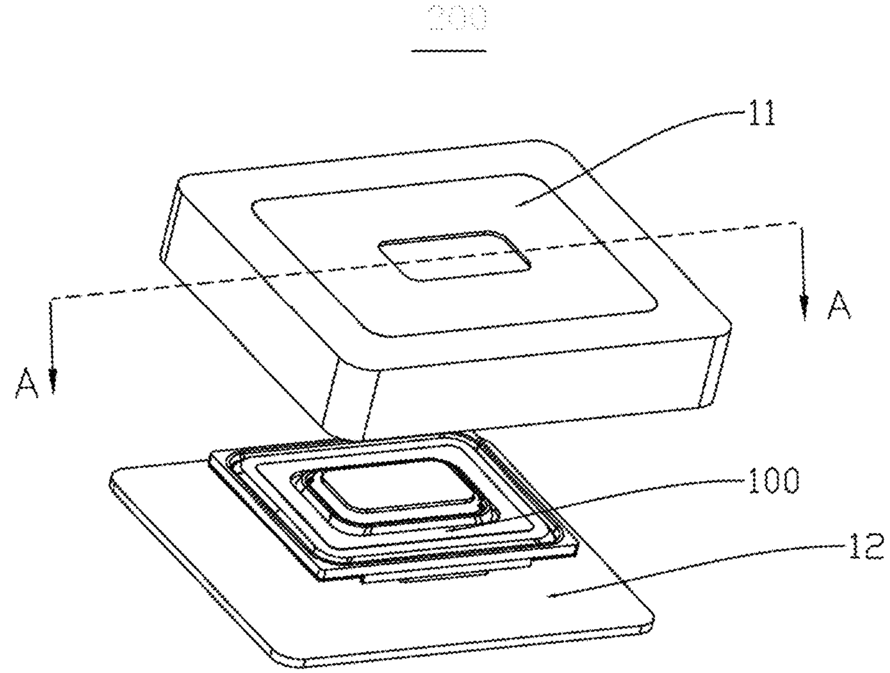
FIG. 1 is an isometric view of a speaker box in accordance with an embodiment of the present invention.

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Please refer to FIGS. 1 to 4. The speaker 100 provided by the present application includes a frame 20, a vibration system 30 fixed to the frame 20, and a magnetic circuit system 40 configured to drive the vibration system 30 to generate sound. The vibration system 30 includes a diaphragm 31 fixed to the frame 20 and a voice coil 32 configured to drive the diaphragm 31 to vibrate. The magnetic circuit system 40 includes a lower plate 41 fixed to the frame 20 and spaced apart from the diaphragm 31, a main magnetic assembly 42 disposed on the lower plate 41, and an auxiliary magnetic assembly 43 arranged around the main magnetic assembly 42 to form a magnetic gap. The voice coil 32 is inserted into the magnetic gap. Specifically, please refer to FIGS. 2 and 3. The main magnetic assembly 42 includes a first main magnet 421 disposed on the lower plate 41, a main pole plate 422 disposed on the first main magnet 421, and a second main magnet 423 disposed on the main pole plate 422. The auxiliary magnetic assembly 43 includes a first auxiliary magnet 431 disposed on the lower plate 41, an auxiliary pole plate 432 disposed on the first auxiliary magnet 431, and a second auxiliary magnet 433 disposed on the auxiliary pole plate 432. This opposing magnetic circuit structure increases the magnetic field strength in the magnetic gap, thereby enhancing the driving force of the voice coil 32.

Figure 2:
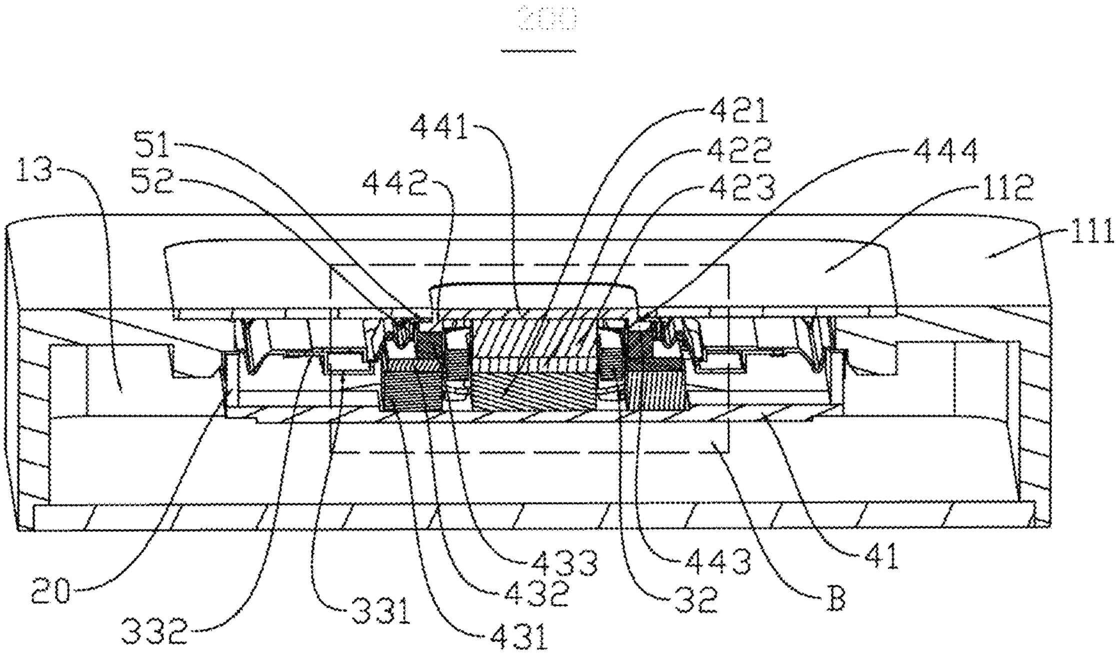
FIG. 2 is a cross-sectional view of the speaker box taken along line A-A in FIG. 1.

To improve the stability of the magnetic circuit system 40, please refer to FIG. 2. The speaker 100 provided by the present application further includes an upper plate 44 arranged opposite to the lower plate 41. The upper plate 44 includes a first part 441 fixed to the second main magnet 423, a second part 442 extending from the first part 441 toward the lower plate 41, and a third part 443 extending from the second part 442 away from the second main magnet 423. The third part 443 is fixed to the second auxiliary magnet 433. The first part 441 is farther from the lower plate 41 than the third part 443, allowing the thickness of the main magnetic assembly 42 to be increased, thereby improving the efficiency of the magnetic circuit. The main magnetic assembly 42 and the auxiliary magnetic assembly 43 are sandwiched between the upper plate 44 and the lower plate 41, ensuring the stability of the magnetic circuit system 40 during the operation of the speaker 100. This enhances the stability and reliability of the speaker 100 and significantly improves its acoustic performance and service life.

To further improve the stability of the magnetic circuit system 40 and optimize the vibration space of the vibration system 30, please refer to FIG. 2. The speaker 100 provided by the present application further includes a fixing ring 50 surrounding and fixed to the upper plate 44. The fixing ring 50 includes a first connecting part 51 fixed to the upper plate 44 and a second connecting part 52 extending from the first connecting part 51 toward the lower plate 41. An inner periphery of the diaphragm 31 is fixed to the second connecting part 52. In this way, the diaphragm 31 is connected to the magnetic circuit system 40 through the fixing ring 50, which not only allows for adjusting the height of the diaphragm 31 but also optimizes the impact of dimensional tolerances on the concentricity of the diaphragm 31 during assembly.

In practical applications, the first connecting part 51 may be supported on a step 444 formed between the second part 442 and the third part 443, or the first connecting part 51 may be sandwiched between the third part 443 and the second auxiliary magnet 433. The height of the fixing ring 50 can be adjusted as described in actual needs, allowing for flexible adjustment of the height of the diaphragm 31 based on the arrangement of the vibration system 30 and the magnetic circuit system 40. This enables better design of the vibration space of the vibration system 30, thereby improving the acoustic performance of the speaker 100.

Optionally, to provide a larger vibration space for the vibration system 30, please refer to FIG. 2. The second auxiliary magnet 433 in the present application is fixed to a portion of the auxiliary pole plate 432. That is, the diaphragm 31 is arranged around the second auxiliary magnet 433, and a portion of the diaphragm 31 is located above the auxiliary pole plate 432. This ensures high magnetic circuit efficiency while achieving better vibration effects.

Figure 3:
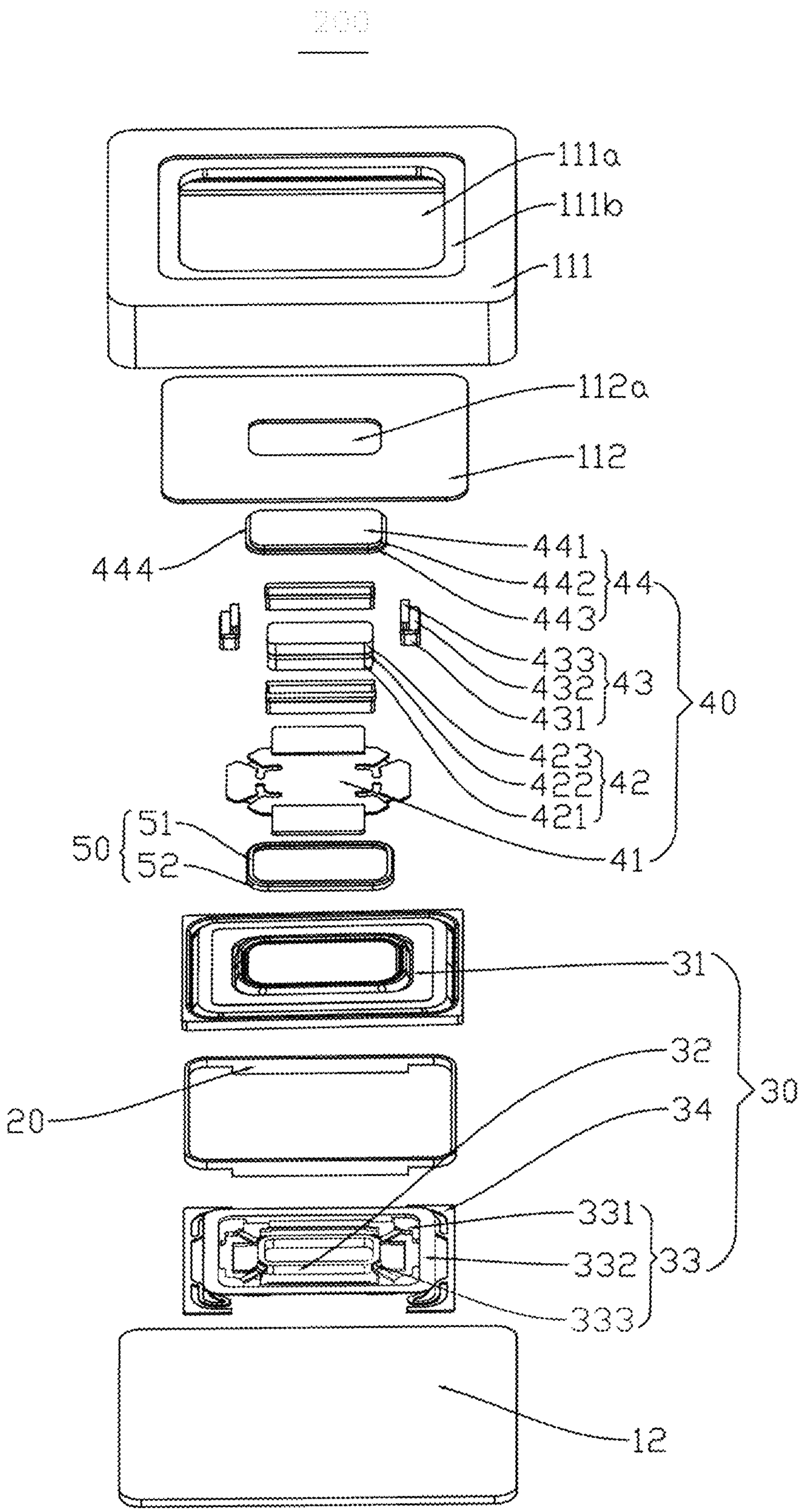
FIG. 3 is an exploded view of the speaker box.

Specifically, please refer to FIG. 3. The vibration system 30 provided by the present application further includes a skeleton 33 fixed to the diaphragm 31 and configured to suspend the voice coil 32 in the magnetic gap. The voice coil 32 has a rectangular structure with rounded corners. The skeleton 33 includes a main body part 331 spaced apart from the diaphragm 31, a fixing part 332 extending from the main body part 331 and bent toward the diaphragm 31, the fixing part 332 being fixed to the diaphragm 31, and a supporting part 333 extending from a corner of the main body part 331 toward the voice coil 32. The supporting part 333 is fixed to a rounded corner of the voice coil 32 to support the voice coil 32.

The vibration system 30 further includes a flexible member 34 fixed to the frame 20 and connected to the skeleton 33. There are two flexible members 34, which are respectively located on opposite sides of the voice coil 32.

Figure 4:
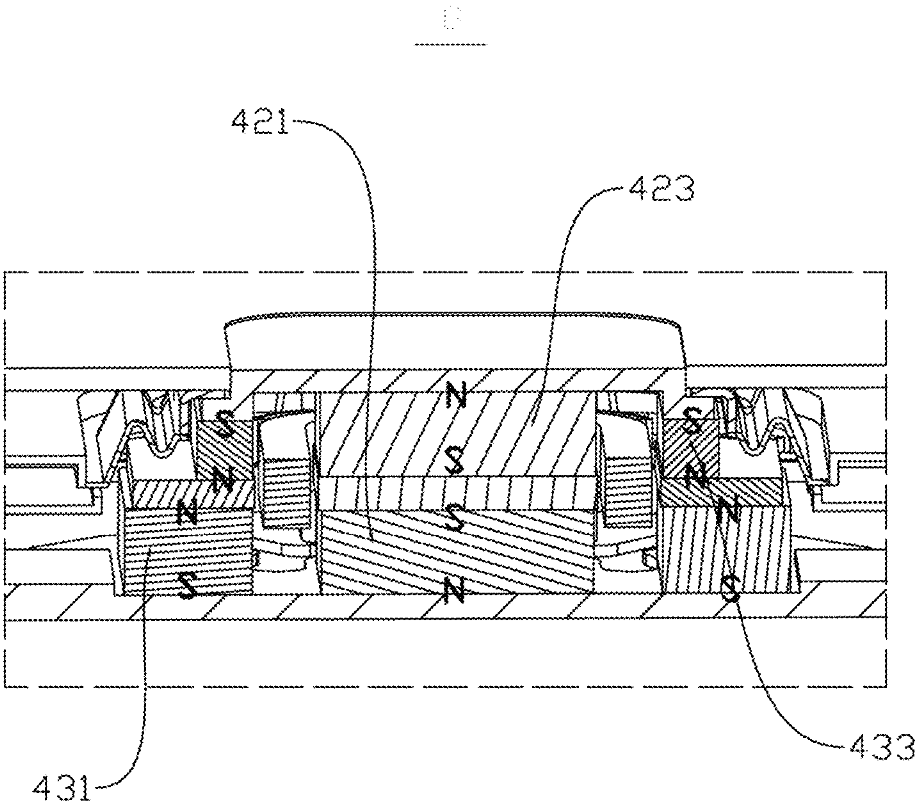
FIG. 4 is an enlarged view of Part B in FIG. 2.

Further, please refer to FIGS. 3 and 4. The auxiliary magnetic assembly 43 includes four groups, which are respectively arranged on four sides of the main magnetic assembly 42. Each group of the auxiliary magnetic assembly 43 is disposed between two corresponding supporting parts 333. The main magnetic assembly 42 and the auxiliary magnetic assembly 43 are magnetized along the vibration direction of the vibration system 30. The first main magnet 421 and the second main magnet 423 are magnetized in opposite directions. The first auxiliary magnet 431 and the second auxiliary magnet 433 are magnetized in opposite directions. The first main magnet 421 and the first auxiliary magnet 431 are magnetized in opposite directions. That is, the magnetic circuit system 40 provided by the present application adopts a five-group opposing magnetic circuit structure, which better increases the magnetic field strength in the magnetic gap and enhances the driving force of the voice coil 32.

Preferably, the fixing ring 50 is made of nickel. The hardness of nickel is greater than that of the diaphragm 31, allowing it to better support the diaphragm 31.

Further, please refer to FIGS. 2 and 3. The present application provides a speaker box 200, which includes an upper cover 11, a lower cover 12 configured to form an accommodating cavity 13 together with the upper cover 11, and the speaker 100 as described above. The upper cover 11 includes a body portion 111 assembled with the lower cover 12. The speaker 100 is fixed to the body portion 111. The body portion 111 is formed with a first through hole 111*a* corresponding to the speaker 100. The upper cover 11 further includes a steel sheet 112 fixed to the body portion 111 and covering the first through hole 111*a*. The steel sheet 112 is formed with a second through hole 112*a*. An inner periphery of the steel sheet 112 is supported on a step 444 formed between the second part 442 and the third part 443. This allows the first part 441 of the upper plate 44 to be embedded in the second through hole 112*a* of the steel sheet 112, thereby reducing the overall thickness of the speaker box 200. Due to the high strength of the steel sheet 112, a thinner thickness can provide better support strength compared to ordinary materials, further enhancing the stability of the magnetic circuit system 40 and improving drop resistance. It also optimizes the thickness of the magnetic circuit system 40 and the vibration space of the speaker 100.

Further, an upper surface of the steel sheet 112 aligns with an upper surface of the first part 441. The diaphragm 31 and the steel sheet 112 are spaced apart to form a front cavity of the speaker box 200.

Moreover, the body portion 111 is further formed with an accommodating groove 111*b* recessed from an upper surface of the body portion 111. The steel sheet 112 is accommodated in the accommodating groove 111*b*, and an upper surface of the steel sheet 112 aligns with the upper surface of the body portion 111.

Compared with the prior art, the speaker provided by the present application includes a main magnetic assembly comprising a first main magnet disposed on the lower plate, a main pole plate disposed on the first main magnet, and a second main magnet disposed on the main pole plate. The auxiliary magnetic assembly includes a first auxiliary magnet disposed on the lower plate, an auxiliary pole plate disposed on the first auxiliary magnet, and a second auxiliary magnet disposed on the auxiliary pole plate. This opposing magnetic circuit configuration increases the magnetic field strength in the magnetic gap, enhances the driving force of the voice coil, and significantly improves the BL value (i.e., the product of magnetic flux density B and voice coil length L) of the voice coil, thereby increasing the efficiency of the magnetic circuit. By providing an upper plate fixed to the main magnetic assembly and the auxiliary magnetic assembly, and a fixing ring fixed to the upper plate, the diaphragm is fixed to the magnetic circuit system through the fixing ring. The height of the diaphragm can be adjusted via the fixing ring, and the impact of dimensional tolerances on the concentricity of the diaphragm during assembly can be optimized.

The speaker box provided by the present application includes a steel sheet with a second through hole on the upper cover. Part of the upper plate is embedded in the second through hole of the steel sheet, and the steel sheet is supported on the step formed between the second part and the third part of the upper plate. This not only optimizes the thickness of the magnetic circuit system and the vibration space of the speaker but also allows the steel sheet to support the magnetic circuit system, improving drop resistance.

The foregoing is merely illustrative of embodiments of the present invention, and it should be noted that modifications may be made to those skilled in the art without departing from the spirit of the invention but are intended to be within the scope of the invention.

What is claimed is:

1. A speaker, comprising:

a frame;

a vibration system fixed to the frame, including a diaphragm fixed to the frame and a voice coil for driving the diaphragm to vibrate;

a magnetic circuit system for driving the vibration system to generate sound, including a lower plate fixed to the frame and spaced apart from the diaphragm, a main magnetic assembly disposed on the lower plate, an auxiliary magnetic assembly arranged around the main magnetic assembly for forming a magnetic gap for at least partially receiving the voice coil;

wherein the main magnetic assembly includes a first main magnet disposed on the lower plate;

a main pole plate disposed on the first main magnet; and a second main magnet disposed on the main pole plate;

the auxiliary magnetic assembly includes a first auxiliary magnet disposed on the lower plate;

an auxiliary pole plate disposed on the first auxiliary magnet; and a second auxiliary magnet disposed on the auxiliary pole plate;

and wherein the magnetic circuit system further includes an upper plate arranged opposite to the lower plate, the upper plate comprising a first part fixed to the second main magnet, a second part extending from the first part toward the lower plate, and a third part extending from the second part away from the second main magnet and fixed to the second auxiliary magnet;

the speaker further includes a fixing ring fixed to the upper plate, including a first connecting part fixed to the upper plate, and a second connecting part extending from the first connecting part toward the lower plate for connecting to an inner periphery of the diaphragm.

2. The speaker as described in claim 1, wherein the diaphragm is arranged around the second auxiliary magnet, and a portion of the diaphragm is located above the auxiliary pole plate.

3. The speaker as described in claim 1, wherein the first connecting part is supported on a step formed between the second part and the third part, or the first connecting part is sandwiched between the third part and the second auxiliary magnet.

4. The speaker as described in claim 1, wherein the vibration system includes a skeleton fixed to the diaphragm and configured to suspend the voice coil in the magnetic gap; the voice coil incudes a rectangular structure with rounded corners; the skeleton comprises a main body part spaced apart from the diaphragm, a fixing part extending from the main body part and bent toward the diaphragm, the fixing part being fixed to the diaphragm, and a supporting part extending from a corner of the main body part toward the voice coil, the supporting part being fixed to a rounded corner of the voice coil to support the voice coil.

5. The speaker as described in claim 4, wherein the auxiliary magnetic assembly includes four groups, the four groups being respectively arranged on four sides of the main magnetic assembly, each group of the auxiliary magnetic assembly being disposed between two corresponding supporting parts, wherein the main magnetic assembly and the auxiliary magnetic assembly are magnetized along a vibration direction of the vibration system; the first main magnet and the second main magnet are magnetized in opposite directions; the first auxiliary magnet and the second auxiliary magnet are magnetized in opposite directions; and the first main magnet and the first auxiliary magnet are magnetized in opposite directions.

6. The speaker as described in claim 1, wherein the fixing ring is made of nickel.

7. A speaker box, comprising:

an upper cover;

a lower cover for forming an accommodating cavity together with the upper cover; and a speaker as described in claim 1 fixed to the upper cover;

wherein the upper cover includes a body portion assembled with the lower cover, the body portion being formed with a first through hole corresponding to the speaker; and wherein the upper cover further includes a steel sheet fixed to the body portion and covering the first through hole, the steel sheet being formed with a second through hole, and an inner periphery of the steel sheet being supported on a step formed between the second part and the third part.

8. The speaker box as described in claim 7, wherein an upper surface of the steel sheet aligns with an upper surface of the first part.

9. The speaker box as described in claim 7, wherein the body portion is further formed with an accommodating groove recessed from an upper surface of the body portion, the steel sheet being accommodated in the accommodating groove, and an upper surface of the steel sheet aligning with the upper surface of the body portion.

10. The speaker box as described in claim 7, wherein the diaphragm and the steel sheet are spaced apart for forming a front cavity of the speaker box.

* * * * *